(12) United States Patent
Hamlik et al.

(10) Patent No.: US 12,552,652 B2
(45) Date of Patent: Feb. 17, 2026

(54) LOAD HANDLER FOR LIFT TRUCK WITH SEGMENTED CHANNEL BEARINGS

(71) Applicant: RIGHTLINE EQUIPMENT, INC., Rainier, OR (US)

(72) Inventors: Jim D. Hamlik, Vancouver, WA (US); Joel D. Hamlik, Vancouver, WA (US); Cameron R. Burak, Vancouver, WA (US)

(73) Assignee: Rightline Equipment, INC., Ranier, OR (US)

(*) Notice: Subject to any disclaimer, the term of this patent is extended or adjusted under 35 U.S.C. 154(b) by 0 days.

(21) Appl. No.: 18/737,966

(22) Filed: Jun. 8, 2024

(65) Prior Publication Data

US 2024/0425337 A1    Dec. 26, 2024

Related U.S. Application Data

(62) Division of application No. 16/842,733, filed on Apr. 7, 2020, now Pat. No. 12,006,197.

(60) Provisional application No. 62/830,542, filed on Apr. 7, 2019.

(51) Int. Cl.
*B66F 9/14*    (2006.01)
*B66F 9/18*    (2006.01)

(52) U.S. Cl.
CPC .............. *B66F 9/148* (2013.01); *B66F 9/18* (2013.01)

(58) Field of Classification Search
None
See application file for complete search history.

(56) References Cited

U.S. PATENT DOCUMENTS

| | | | | |
|---|---|---|---|---|
| 3,450,288 | A * | 6/1969 | Walsh ..................... | B66F 9/183 414/667 |
| 4,279,564 | A * | 7/1981 | Weinert .................. | B66F 9/183 414/667 |
| 4,381,166 | A * | 4/1983 | Smart ..................... | B66F 9/143 74/89.32 |
| 5,217,343 | A * | 6/1993 | Bostad .................... | B66F 9/148 414/667 |
| 10,179,724 | B2 * | 1/2019 | Kaup ...................... | B66F 9/143 |
| 10,550,886 | B2 * | 2/2020 | Sweeney ................ | F16C 33/20 |
| 11,137,028 | B2 * | 10/2021 | Campbell ............... | F16C 17/02 |
| 2008/0063503 | A1 * | 3/2008 | Garrett ................... | A01D 87/122 414/729 |
| 2019/0337781 | A1 * | 11/2019 | Schlott .................... | B66F 9/0755 |
| 2022/0332555 | A1 * | 10/2022 | Schiavi ................... | B66F 9/142 |

* cited by examiner

*Primary Examiner* — Mark C Hageman
(74) *Attorney, Agent, or Firm* — Rylander & Associates, PC; Philip R. M. Hunt (57) ABSTRACT

A clamp assembly for a lift truck load handler comprising a frame with one or more guide channels and one or more load handler appendages such as forks or clamp arms. The appendages are coupled to arms, each slidingly inserted in one of the guide channels. The guide channels each have a segmented channel bearing set inserted therein. Each segmented channel bearing set has an outer channel bearing set, an inner channel bearing set and a bearing spine. Each of the segmented channel bearing sets is inserted into the first guide channel with an outer channel bearing set closer to a load handler appendage than the inner channel bearing set.

6 Claims, 9 Drawing Sheets

LOAD HANDLER FOR LIFT TRUCK WITH SEGMENTED CHANNEL BEARINGS

CROSS-REFERENCE TO RELATED APPLICATIONS

The present application is a divisional application of application Ser. No. 16/842,733, filed 2020 Apr. 7, which claims the benefit of U.S. Provisional Application No. 62/830,542, filed 2019 Apr. 7, incorporated herein by reference.

FIELD OF THE INVENTION

The present invention relates to cargo handling equipment. More particularly, the present invention relates to load handlers for use primarily with lift trucks.

BACKGROUND

Figure 1:
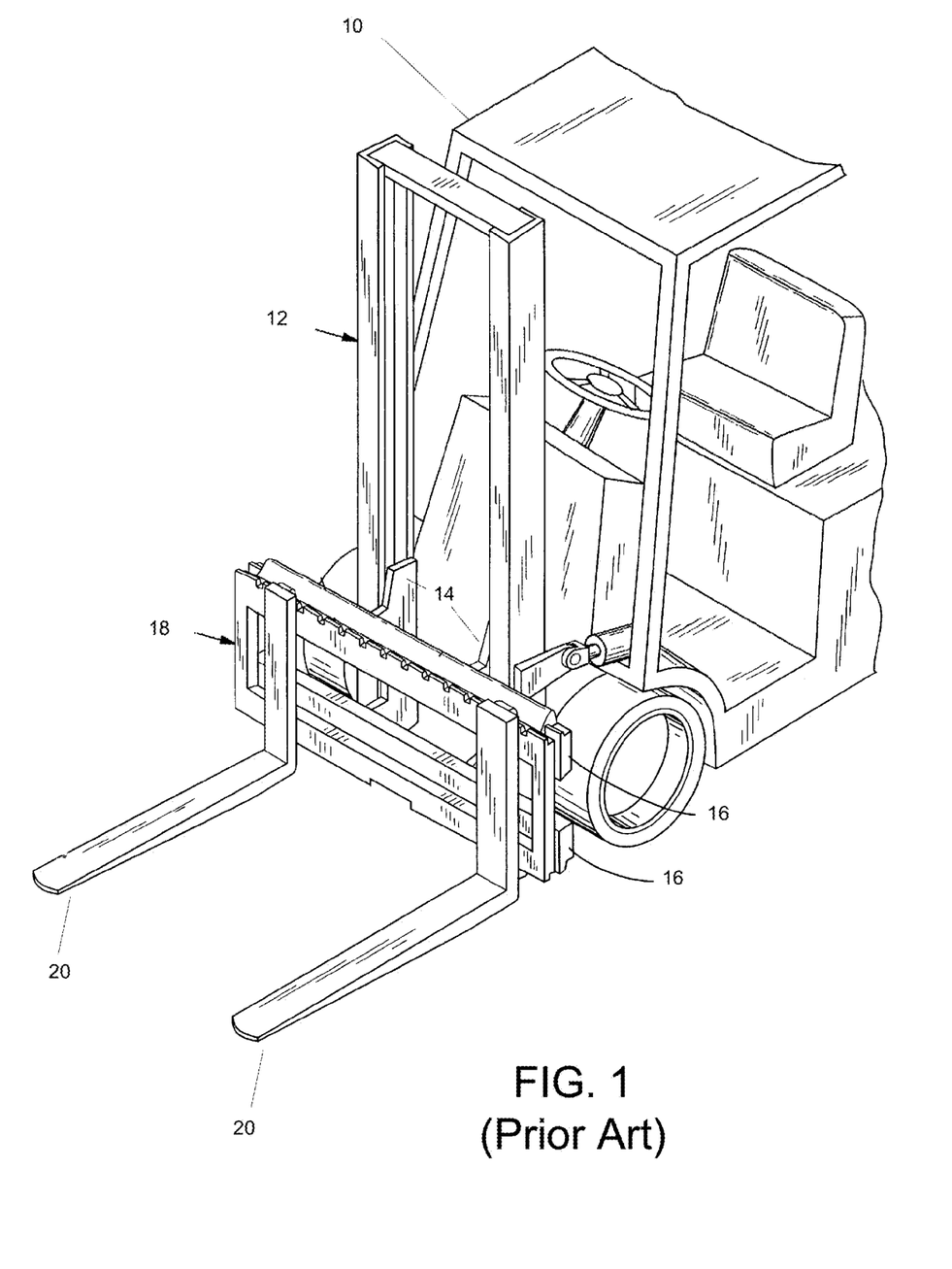
FIG. 1 shows an isometric view of a prior art lift truck, illustrating typical components of a lift truck equipped with forks.

Material handling vehicles such as lift trucks are used to pick up and deliver loads between stations. Atypical lift truck 10 has a mast 12, which supports a load-lifting carriage 14 that can be raised along the mast 12 (see FIG. 1). The carriage 14 typically has one or more carriage bars 16 to which a fork frame 18 is mounted. The carriage bars 16 are coupled to the mast in a way that allows the lift truck 10 to move the carriage bars 16 up and down, but not laterally relative to the truck. The fork frame 18 carries a pair of forks 20. An operator of the lift truck 10 maneuvers the forks 20 beneath a load prior to lifting it.

A simple pair of forks 20 mounted on a fork frame 18 is not the only type of load handler that can be mounted on a lift truck 10. One other type of load handler is the load handler. The single dual handler has four forks—two outer forks and two inner forks that can be arranged in different patterns by moving the forks around on the load handler frame either manually or with hydraulic actuators. For example, the four forks can be spread out, which can be useful for picking up two pallets at the same time. Or, each of the outer forks can be moved in towards their associated inner fork, to simulate a standard two fork load handler. Conventionally designed load handlers can be noisy when the forks are rearranged, the bearings can wear out quickly and uneven edges of the forks can damage loads and other surfaces.

BRIEF DESCRIPTION OF THE DRAWINGS

The present invention will be described by way of representative embodiments, illustrated in the accompanying drawings in which like references denote similar elements, and in which.

DETAILED DESCRIPTION

Before beginning a detailed description of the subject invention, mention of the following is in order. When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming but would nevertheless be a routine undertaking of engineering for those of ordinary skill in the art having the benefit of this disclosure.

Use of directional terms such as "upper," "lower," "above," "below", "in front of," "behind," etc. are intended to describe the positions and/or orientations of various components of the invention relative to one another as shown in the various Figures and are not intended to impose limitations on any position and/or orientation of any embodiment of the invention relative to any reference point external to the reference. Herein, "left" and "right" are from the perspective of an operator of a lift truck when the operator is in front of the truck facing the fork frame. Herein, "lateral" refers to directions to the left or the right and "longitudinal" refers to a direction perpendicular to the lateral direction and to a plane defined by the fork frame.

Those skilled in the art will recognize that numerous modifications and changes may be made to the various embodiments without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the first embodiment is essential. Other embodiments are possible, their specific designs depending upon the particular application. As such, the scope of the invention should not be limited by the particular embodiments herein described but should be defined only by the appended claims and equivalents thereof.

First Representative Embodiment

Figure 2:
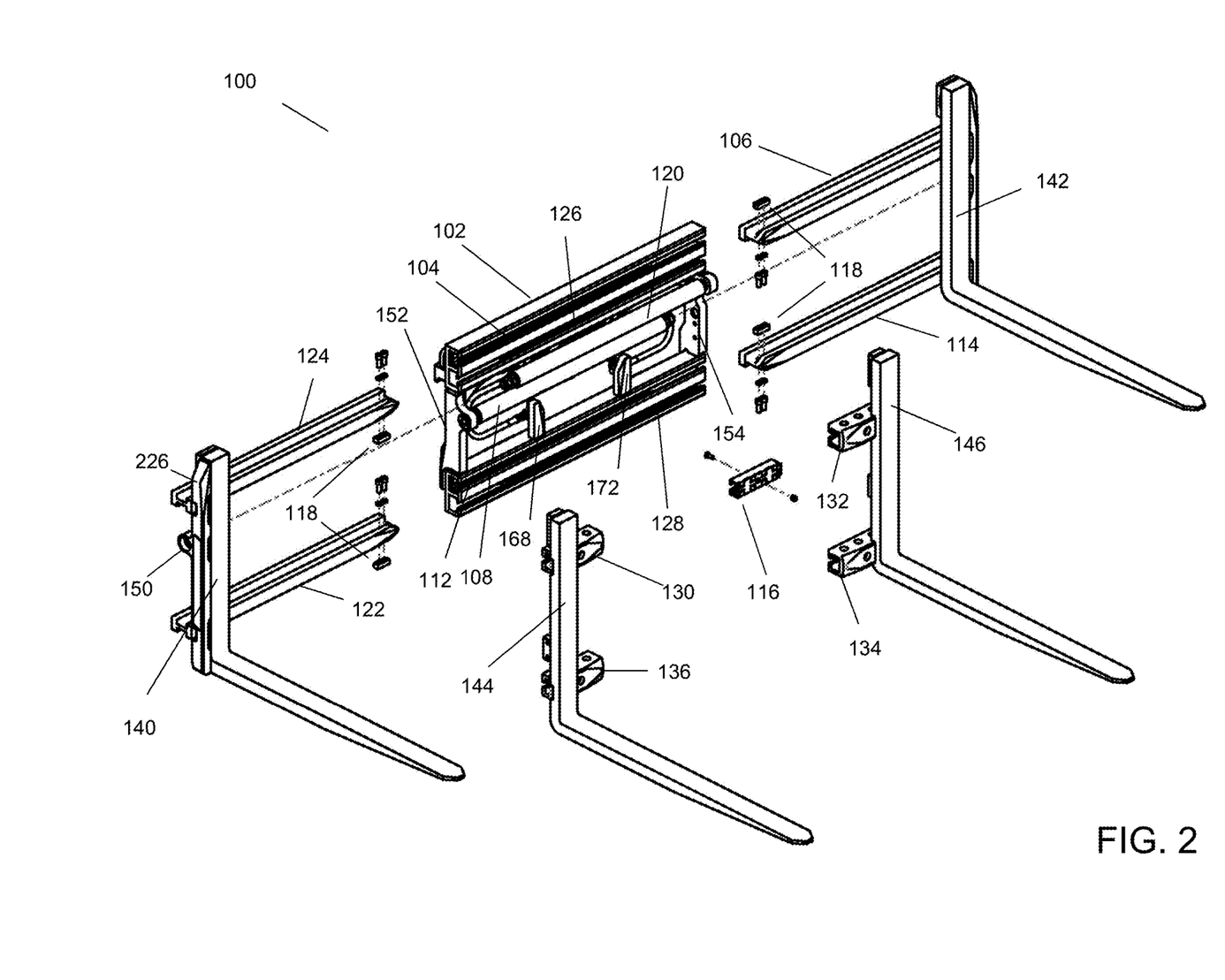
FIG. 2 shows an exploded isometric front left view of a first representative embodiment of the load handler.
Figure 3:
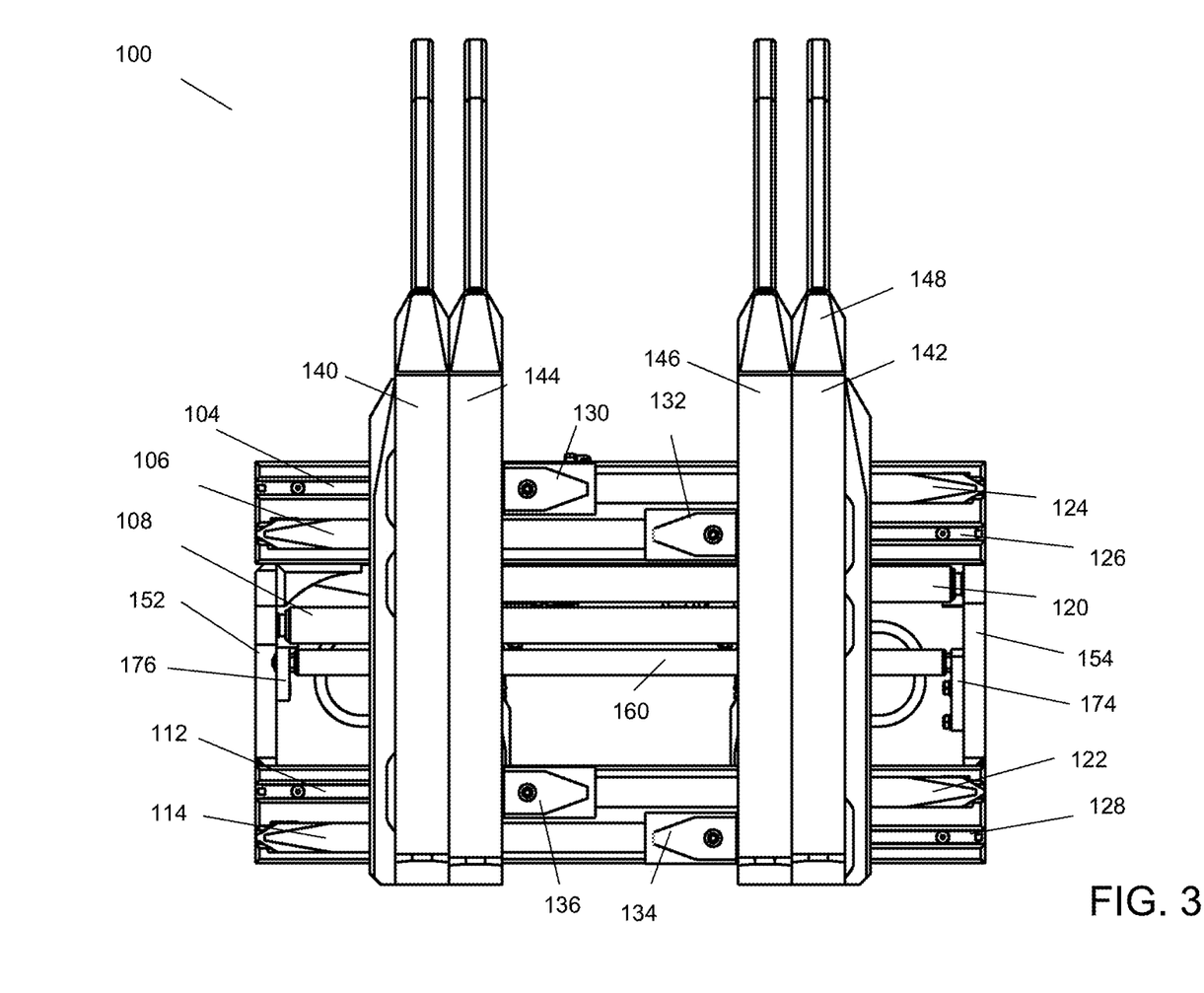
FIG. 3 shows a front view of the first representative embodiment of the load handler.

FIG. 2 shows an exploded isometric front left view of a first representative embodiment of a load handler 100. FIG. 3 shows front view of the first representative embodiment of the load handler 100. The core of the load handler 100 is a frame 102 comprising a first guide channel 104 coupled on top of a second guide channel 126 and a third guide channel 112 coupled on top of a fourth guide channel 128. The second guide channel 126 is coupled to and above the third guide channel 112 by a first (left) frame side bar 152 and a second (right) frame side bar 154. The frame 102 is configured to be removeably coupled to a carriage 14 of a lift truck 10.

Coupled to the right frame side bar 154 below the second guide channel 126 is a first (left) fork actuator 120 and below that, a second (right) fork actuator 108 is coupled to the left frame side bar 152. Coupled to the top of the third guide channel 112 are a first (left) lower stop 168 and a second (right) lower stop 172.

Figure 4:
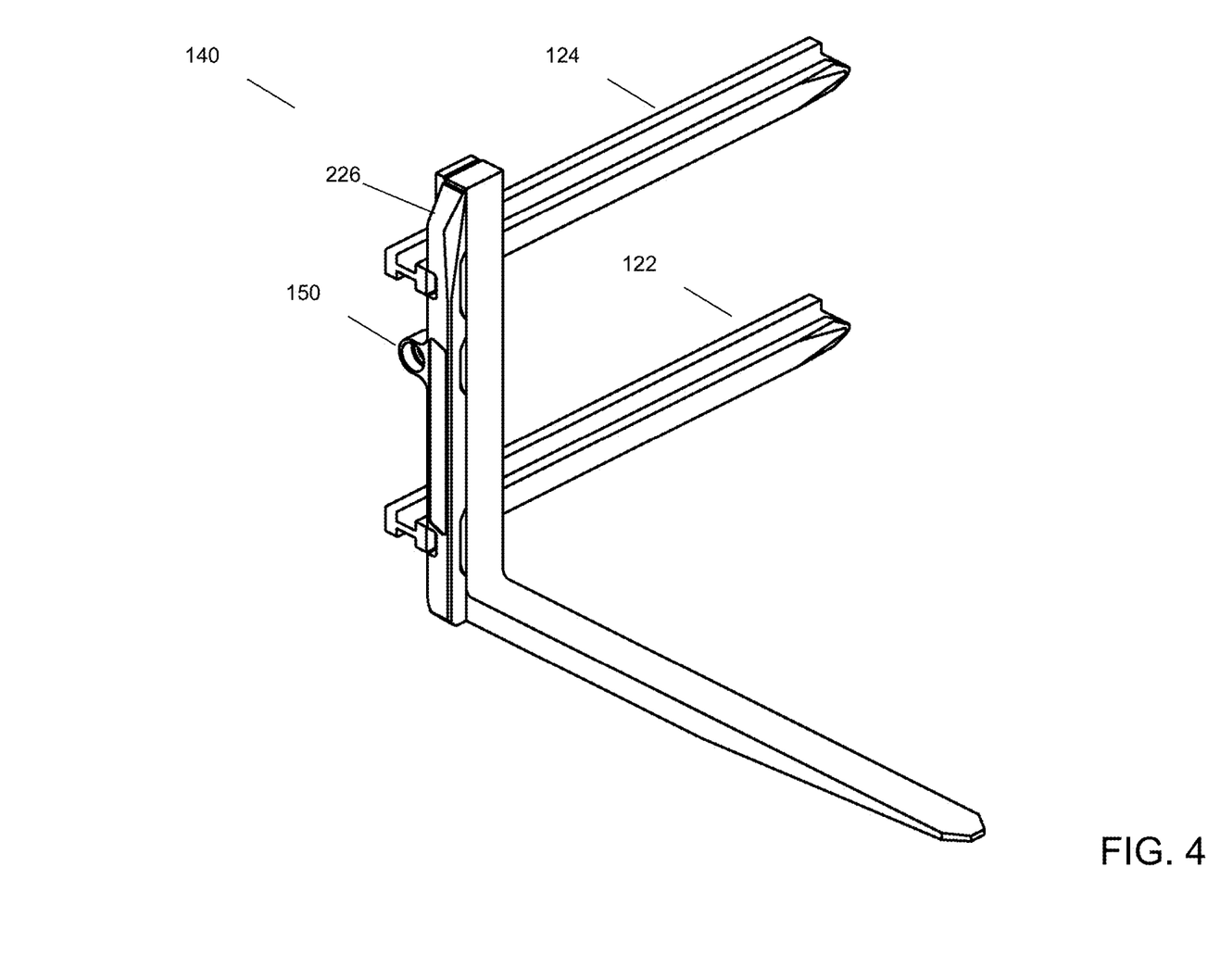
FIG. 4 shows an exploded isometric front left view of a first (left) master fork of the first representative embodiment of the load handler.

The load handler 100 also has a first (left) master fork 140, a second (right) master fork 142, a first (left) slave fork 144, and a second (right) slave fork 146. The left master fork 140 has a first (left) upper arm 124 and a first (left) lower arm 122 coupled thereto by bolting or welding. The left master fork 140 has a wing gusset 226 coupled thereto by bolting or welding. The wing gusset 226 extends along the vertical portion of the left master fork 140 from above the coupling point of the upper left arm 124 to below the coupling point of the lower left arm 122. The wing gusset 226 together with the vertical part of the left master fork 140 provides a wider attachment point for the arms 122, 124 and providing greater torque strain resistance than the vertical part of the left master fork 140 would by itself. The wing gusset 226 provides a smooth, even surface for the left flank of the left master fork 140 that is less likely to catch and damage walls or foreign objects than would smaller conventional gussets that only extend just above and below the coupling points of each of the arms 122, 124. The wing gusset 226 has a cylinder anchor 150 to provide a point for connection to the left fork actuator 120. Similarly, the right master fork 142 has a second (left) upper arm 106 and a second (left) lower arm 114 coupled thereto by bolting or welding. The upper right arm 106 and the lower right arm 114 are coupled lower on the right master fork 142 than the corresponding arms 122, 124 on the left master fork 140 so that the horizontal portions of the master forks 140, 144 are at the same elevation when slidingly coupled to the frame 102 since the arms of the right master fork 142 slide into different channels than do the arms of the left master fork 140. The right master fork 142 similarly has a wing gusset that is a mirror image of the wing gusset 226 on the left master fork 140 with similar structure and function except the cylinder anchor for attaching the right fork actuator 108 is lower to accommodate the lower position of the right fork actuator 108. The left master fork 140 sliding couples with the frame 102, the upper left arm 124 sliding into the first guide channel 104 and the lower left arm 122 sliding into the third guide channel 112. Similarly, the right master fork 142 slidingly couples with the frame 102, the upper right arm 106 sliding into the second guide channel 126 and the lower right arm 114 sliding into the fourth guide channel 128.

The load handler 100 has a first (left) slave fork 144 and a second (right) slave fork 146. The left slave fork 144 has a first (left) upper slave carrier 130 and a first (left) lower slave carrier 136 that slidingly couple the left slave fork 144 to the front portions of upper left arm 124 and lower left arm 122 respectively. An arm stop 118 detachably coupled to the inside end of the upper left arm 124 and a second arm stop 118 detachably coupled to the inside end of the lower left arm 122 prevent the left slave fork 144 from sliding off the arms 122, 124 once installed. Similarly, the right slave fork 146 has a second (right) upper slave carrier 132 and a second (right) lower slave carrier 134 coupled thereto that slidingly couple the right master fork 142 to the front portions of upper right arm 106 and right slave fork 146 respectively. The right slave fork 146 has similar, but mirror image structure as the left slave fork 144 and similar function, except the slave carriers 132, 134 are coupled to the right slave fork 146 in a lower position than the slave carriers 130, 136 coupled to the left slave fork 144 so that the horizontal portions of the slave forks 144, 146 are at the same elevation when slidingly coupled to the arms 122, 124, 106, 114 of the master forks 140, 142. The slave carriers 130, 132, 134, and 136 each have an easily detachable and replaceable slave bearing 116 of bearing material coupled thereto.

Figure 5:
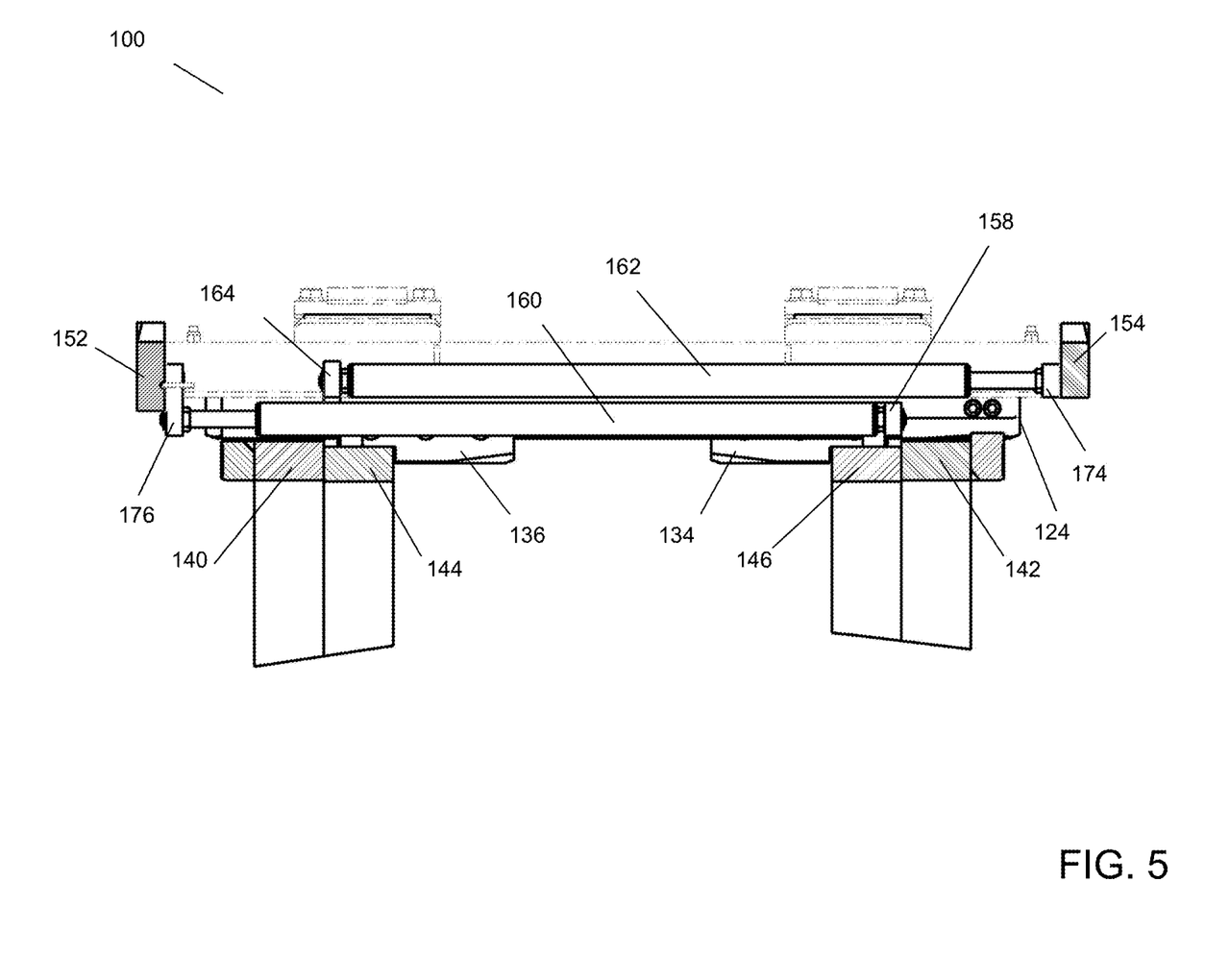
FIG. 5 shows top sectional view of the first representative embodiment of the load handler at the level of the slave fork attenuators.

The load handler 100 has a second (right) slave fork attenuator 160 coupled to the left frame side bar 152 with a second (right) attenuator bracket 176 and coupled to the right slave fork 146 with a second (right) slave fork attenuator bracket 158. The load handler 100 also has a first (left) slave fork attenuator 162 coupled to the right frame side bar 154 with a first (left) attenuator bracket 174 and to the left slave fork 144 with a first (left) slave fork attenuator bracket 164. (See FIG. 5 showing a top sectional view of the first representative embodiment of the load handler 100 at the level of the slave fork attenuators 160, 162). In conventional load handlers, the slave fork attenuators are mounted one above the other. However, in the first representative load handler 100 described herein, they are mounted in a fore-and-aft arrangement with the right slave fork attenuator 160 mounted in front of the left slave fork attenuator 162 at the same elevation. This provided an improved window of visibility through the frame 102 between the attenuators 160, 162 and the third guide channel 112.

The attenuators 160, 162 provide drag to resist the motion of the slave forks 144, 146. For example, when the left master fork 140 is moved outward and leftward by the left fork actuator 120, friction between the slave carriers 130, 136 of the left slave fork 144 and the arms 122, 124 of the left master fork 140 tend to pull the left slave fork 144 outward and leftward as well. The left slave fork attenuator 162 provides sufficient resistance to overcome this resistance and keep the left slave fork 144 stationary relative to the frame 102, at least until the arm stops 118 at the right end of the arms 122, 124 contact the slave carriers 130, 136. The full force of the left fork actuator 120 is then transmitted through the arm stops 118 to the slave carriers 130, 136. This force is sufficient to overcome the resistance provided by the left slave fork attenuator 162 and moves the left slave fork 144 outward and leftward until stopped by the left slave fork attenuator 162. Then the left fork actuator 120 is then operated in the reverse direction, pulling the left master fork 140 rightward, the left slave fork attenuator 162 pulls the left slave fork 144 rightward to match the rightward motion of the arm stops 118 on the arms 122, 124 of the left master fork 140. The left slave fork attenuator 162 will continue to pull the left slave fork 144 rightward until the end of its stroke or until the end of the stroke of the left fork actuator 120. Similarly, the right slave fork 146 moves outward and inward in conjunction with the right fork actuator 108, the right master fork 142, and the right slave fork attenuator 160.

Figure 6:
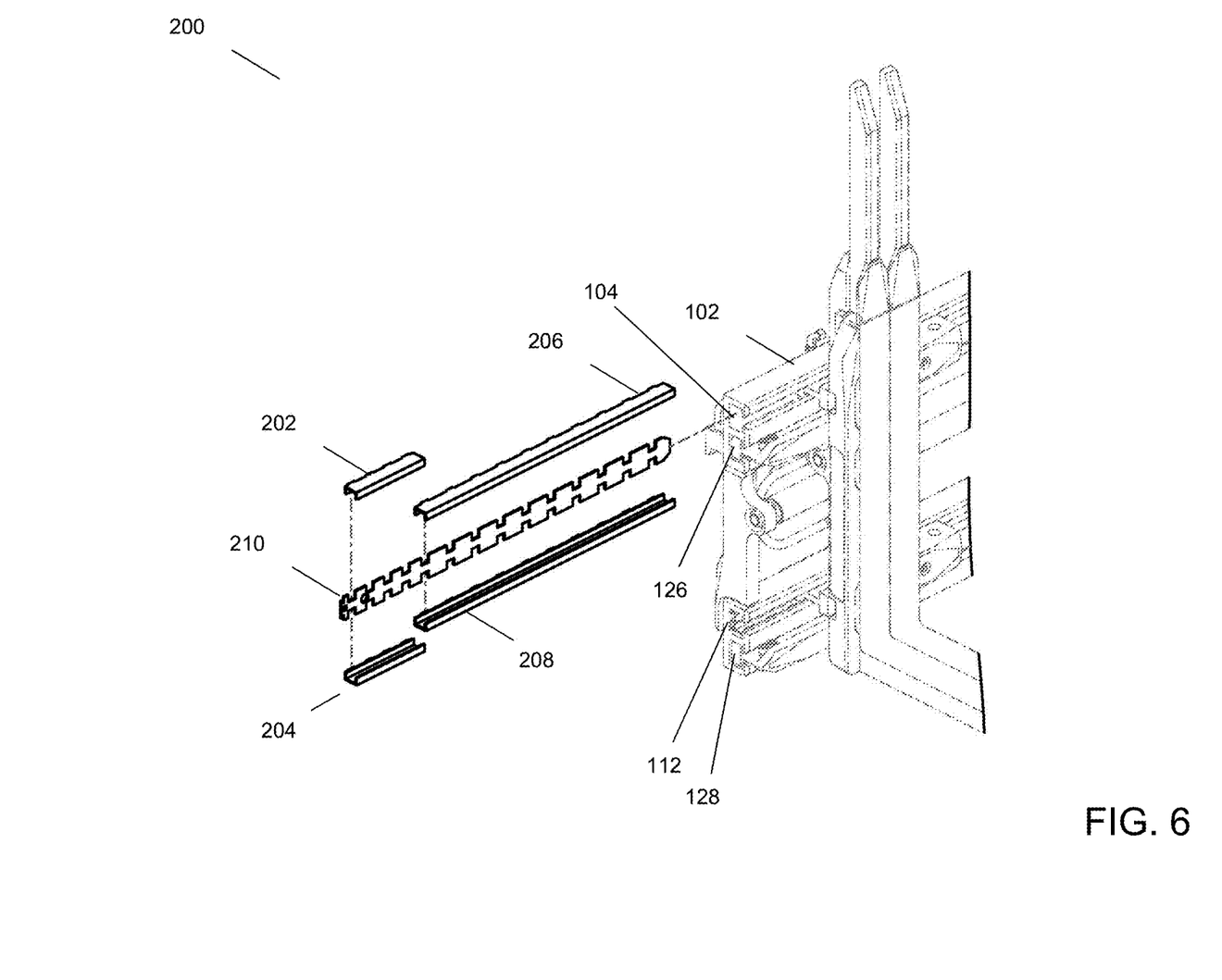
FIG. 6 shows an exploded isometric front left view of a segmented channel bearing set of the first representative embodiment of the load handler.

FIG. 6 shows an exploded isometric front left view of a segmented channel bearing set 200 of the first representative embodiment of the load handler. The segmented channel bearing set 200 has an outer channel bearing set, an inner channel bearing set and a bearing spine 210. The outer channel bearing set comprising an upper outer bearing 202 and a lower outer bearing 204. The inner channel bearing set comprising an upper inner bearing 206 and lower inner bearing 208. The upper inner bearing 206 and the upper outer bearing 202 are coupled to and on top of the bearing spine 210. The lower inner bearing 208 and the lower outer bearing 204 are coupled to and under the bearing spine 210. The bearings are made of conventional bearing materials. One segmented channel bearing set 200 is inserted into the interior channel cavity of a left side of the first guide channel 104 with the outer bearings 202, 204 to the left of the inner bearings 206, 208, so the outer bearings 202, 204 are closer to the left master fork 140 than the inner bearings 206, 208. Another segmented channel bearing set 200 is similarly inserted into the interior channel cavity of a left side the third guide channel 112, so the outer bearings 202, 204 are closer to the left master fork 140 than the inner bearings 206, 208. Two more segmented channel bearing set 200 are inserted into the interior channel cavities of a right side of the second guide channel 126 and a right side of the fourth guide channel 128 with the outer bearings 202, 204 outboard of the inner bearings 206, 208, so the outer bearings 202, 204 are closer to the right master fork 142 than the inner bearings 206, 208. Conventional load handlers typically have channel bearing sets with only single upper and single lower bearings coupled by a spine or just a single channel shaped bearing that fits with the guide channel. However, with load handlers, the most wear occurs on the outer portion of bearing closest to where the arms enter the guide channel. This necessitates frequent replacement of the entire bearing. However, with the segmented channel bearing set 200, only the outer bearings 202, 204 need frequent replacement, saving costs. The outer bearings 202, 204 are the same as the slave bearing 116 for the slave carriers 130, 132, 134, and 136, allowing users to only need to stock a single type of bearing for regular wear. The segmented channel bearing set 200 may be used in alternative load handler embodiments in which the master forks 140, 142 are replaced with some other type of load handling arm appendage, such as a clamp plate.

Figure 7A:
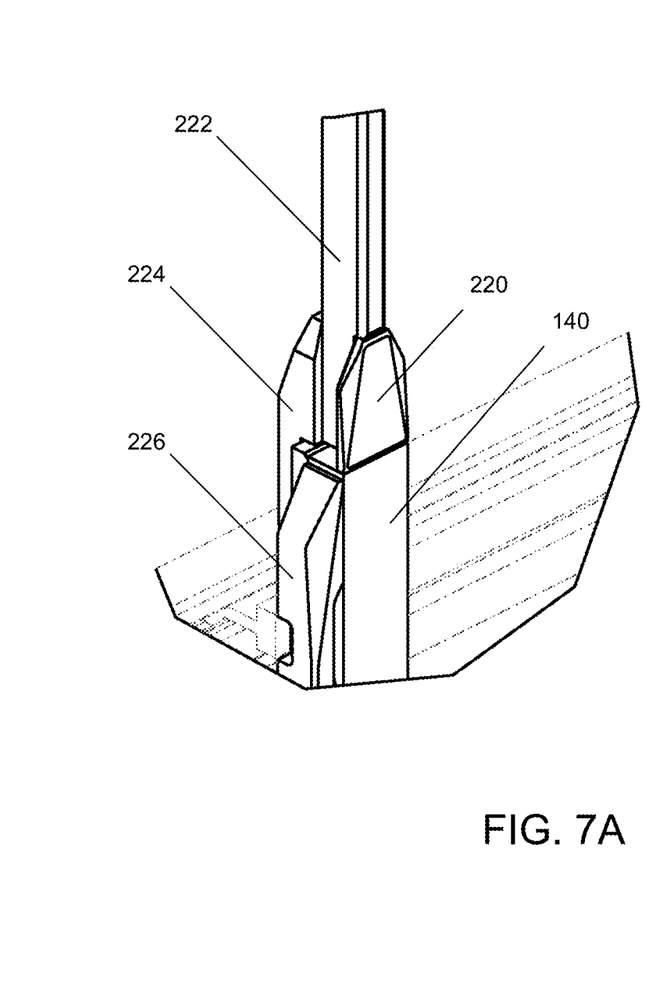
FIG. 7A an isometric front left view of a backrest guard and associated components of the first representative embodiment of the load handler.
Figure 7B:
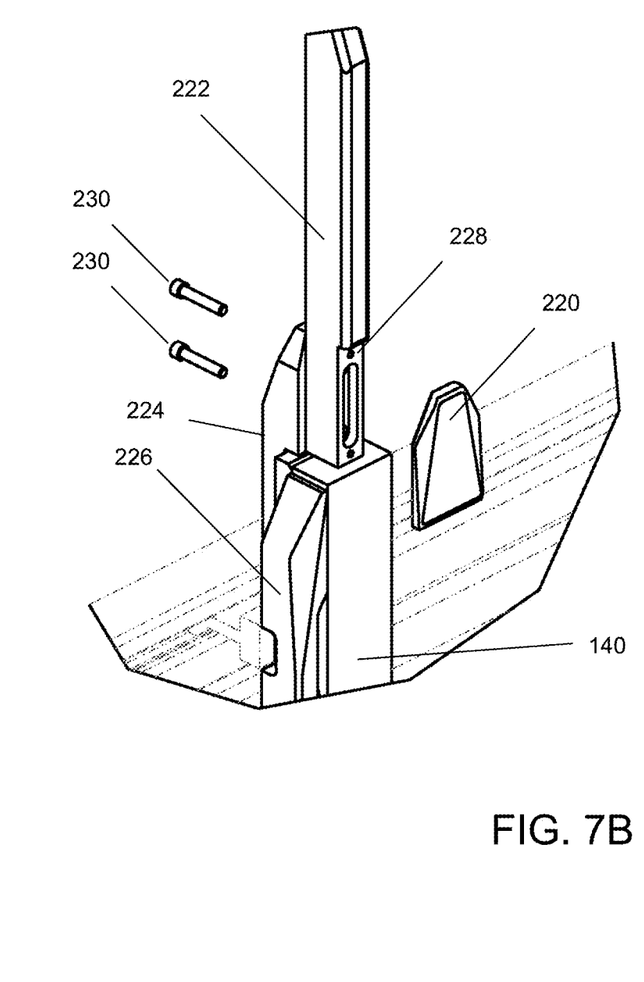
FIG. 7B an exploded isometric front left view of the backrest guard and associated components of the first representative embodiment of the load handler.
Figure 8A:
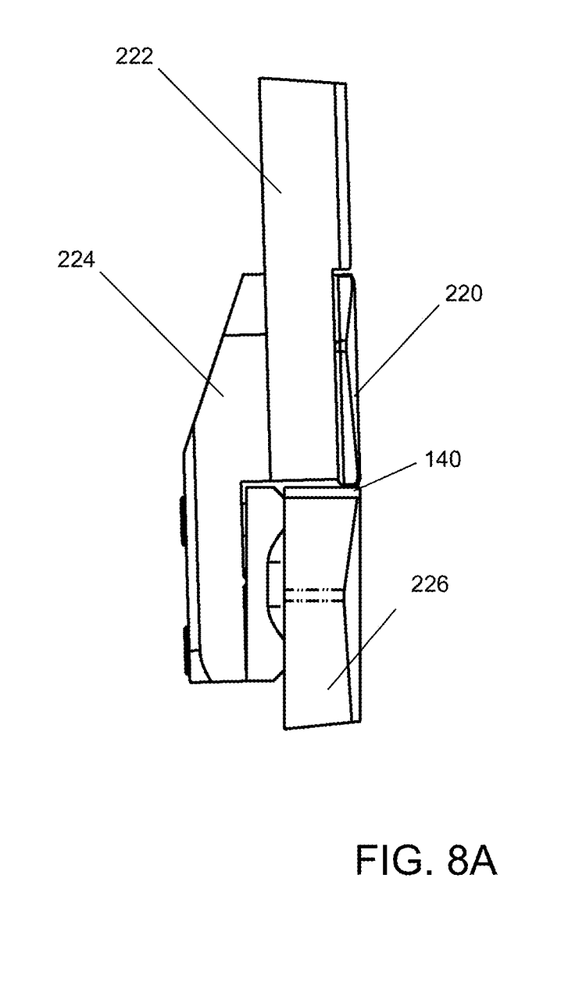
FIG. 8A is a first (left) side view of the backrest guard and associated components of the first representative embodiment of the load handler with the backrest tilted back.
Figure 8B:
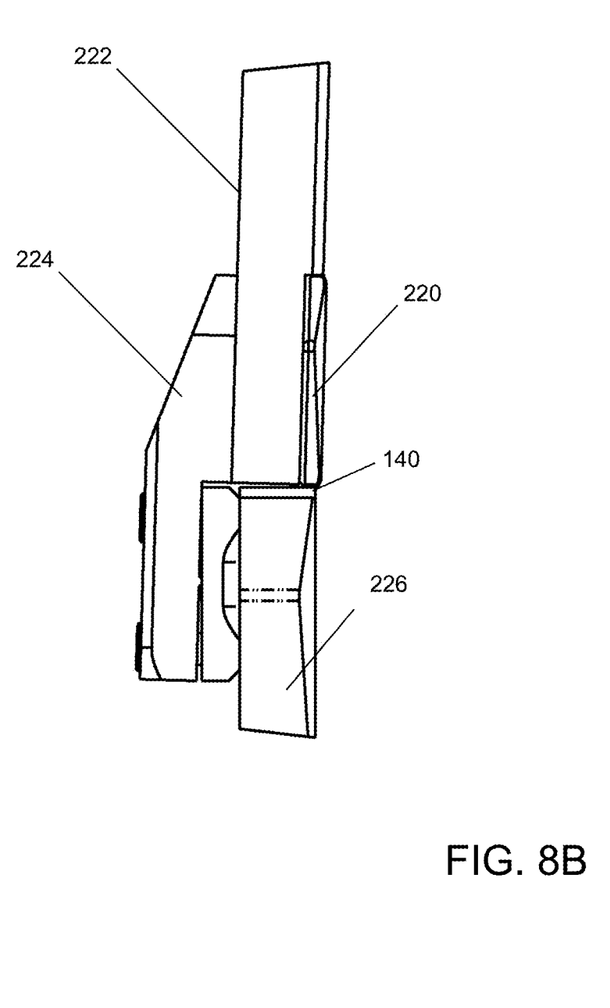
FIG. 8B is a first (left) side view of the backrest guard and associated components of the first representative embodiment of the load handler with the backrest tilted forward.

FIGS. 7A and 7B show front left isometric views of a backrest guard 220 and associated components of the first representative embodiment of the load handler 100. The load handler 100 has a backrest 222 coupled to a backrest bracket 224 (typically welded) that is coupled to the back of the on the left master fork 140 (typically by cap screws). The right master fork 142, left slave fork 144, right slave fork 146 typically have backrests 222 coupled thereto as well. The backrest bracket 224 is a rocker bracket that can be adjusted so that the backrest 222 is in a position tilting backwards (see FIG. 8A), tilting forwards (see FIG. 8B) or any position in-between. When the backrest 222 is tilted backwards, a top forward edge of the fork coupled thereto may be exposed. When the backrest 222 is tilted forwards, a bottom forward edge of the backrest 222 coupled thereto may be exposed. These edges can be sharp and potentially damaging to loads. The backrest 222 has a backrest guard pocket 228 into which a backrest guard 220 is inserted and secured with cap screws 230 from the rear. The backrest guard 220 is adjustable and can slide up or down within the backrest guard pocket 228. The backrest guard 220 slides up and down to cover edges of the fork and backrest, preventing damage.

Second Representative Embodiment

Figure 9:
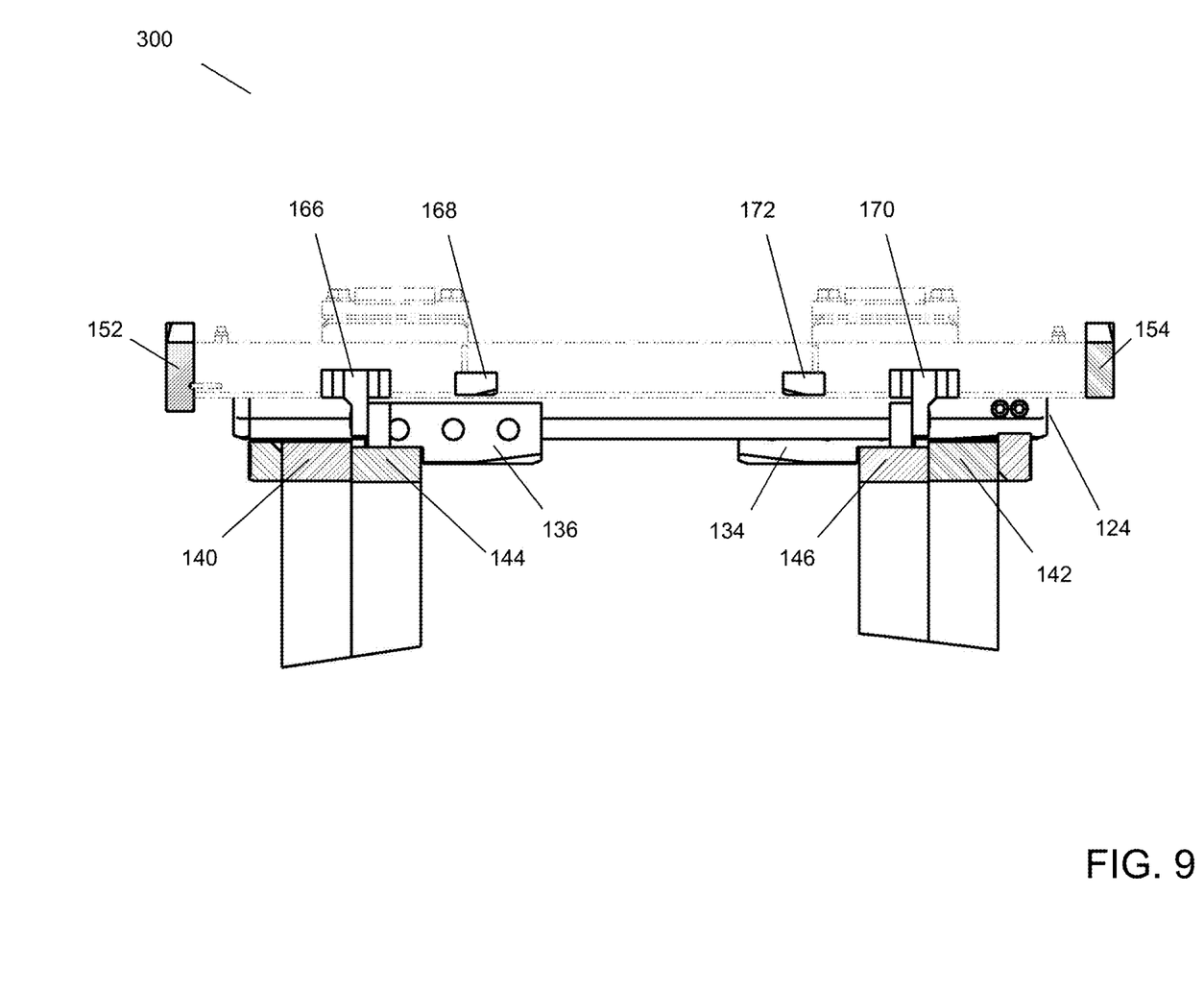
FIG. 9 shows top sectional view of a second representative embodiment of the load handler at the level of the lower stops.

FIG. 9 shows top sectional view of a second representative embodiment of the load handler 300 at the level of the lower stops. The second representative embodiment of the load handler 300 is the same as the first representative load handler 100 but with the following changes. The right slave fork attenuator 160, left slave fork attenuator 162, the right attenuator bracket 176, and the left attenuator bracket 174 are not present. The right slave fork attenuator bracket 158 is replaced with a second (right) slave fork stop 170 and the left slave fork attenuator bracket 164 is replaced with a first (left) slave fork stop 166. This provides an improved window of visibility through the frame 102 between the actuators 108, 120 and the third guide channel 112 and the slave fork stops 166, 170 are less expensive than the slave fork attenuator 160, 162. The left slave fork stop 166 and the right slave fork stop 170 have bumpers coupled on either side of a metal plate. The bumpers comprise a dampening material such as rubber. This dampens noise and vibration when the slave fork stops 166, 170, contact either the frame side bars 152, 154 or the lower stops 168, 172.

The left slave fork stop 166 and the right slave fork stop 170 control the motion of the slave forks 144, 146 instead of the attenuators 160, 162. For example, when the left master fork 140 is moved outward and leftward by the left fork actuator 120, friction between the slave carriers 130, 136 of the left slave fork 144 and the arms 122, 124 of the left master fork 140 tend to pull the left slave fork 144 outward and leftward as well. The left slave fork stop 166 eventually contacts the left frame side bar 152, preventing further leftward motion of the left slave fork 144. The left master fork 140 keeps moving leftward at least until the arm stops 118 at the right end of the arms 122, 124 contact the slave carriers 130, 136. Then the left fork actuator 120 is then operated in the reverse direction, pulling the left master fork 140 rightward, carrying the left slave fork 144 rightward as well until the left slave fork stop 166 contacts the left lower stop 168 mounted on top the third guide channel 112 of the frame 102. The left master fork 140 continues to move rightward until contacting the left slave fork 144 or the end of the left fork actuator 120 is reached. Similarly, the right slave fork 146 moves outward and inward in conjunction with the right fork actuator 108, the right master fork 142, the right frame side bar 154, the right lower stop 172, and a second (right) slave fork stop 170 coupled to the right slave fork 146.

Alternative Embodiments

One alternative embodiment is load handler 100 as described in the first representative embodiment, with the fore-and-aft slave fork attenuator 160, 162 along with associated components, but not necessarily the segmented channel bearing set 200, and the backrest guards 220.

Another alternative embodiment is load handler 100 as described in the first representative embodiment, with the segmented channel bearing set 200 along with associated components, but not necessarily the fore-and-aft slave fork attenuator 160, 162, and the backrest guards 220.

Another alternative embodiment is load handler 100 as described in the first representative embodiment with the backrest guards 220 along with associated components, but not necessarily the segmented channel bearing set 200, and the fore-and-aft slave fork attenuator 160, 162.

Another alternative embodiment is the frame 102 and the segmented channel bearing sets 200 as described in the first representative embodiment. This alternative embodiment can be the basis for a single/dual pallet handler, a clamp load handler, or some other type of load handler designed for use with a lift truck 10.

Another alternative embodiment is load handler 300 as described in the second representative embodiment, but not necessarily the segmented channel bearing set 200, and the backrest guards 220.

Another alternative embodiment is load handler 300 as described in the second representative embodiment, with the segmented channel bearing set 200 along with associated components, but not necessarily the backrest guards 220.

Another alternative embodiment is load handler 100 as described in the second representative embodiment with the backrest guards 220 along with associated components, but not necessarily the segmented channel bearing set 200.

What is claimed is:

1. A load handler for a lift truck comprising:
a frame with one or more guide channels including a first guide channel;
one or more load handler appendages, including a first load handler appendage coupled to a first arm, wherein the first arm is slidingly inserted in the first guide channel;
one or more segmented channel bearings, including a first segmented channel bearing having a first outer channel bearing, and a first inner channel bearing; and
wherein the first segmented channel bearing is inserted into the first guide channel with the first outer channel bearing closer to a first guide channel first lateral end than the first inner channel bearing, and the first inner channel bearing positioned laterally inward from the first outer channel bearing.

2. The load handler of claim 1,
wherein the first load handler appendage is a first master fork.

3. The load handler of claim 1,
wherein the first load handler appendage is a first clamp plate.

4. The load handler of claim 1,
wherein the first segmented channel bearing includes a first bearing spine detachably coupled to the first guide channel;
wherein the first outer channel bearing comprises a first upper outer bearing and a first lower outer bearing; and
wherein the first inner channel bearing comprises a first upper inner bearing and a first lower inner bearing;
wherein the first upper inner bearing and the first upper outer bearing are coupled to and on top of the first bearing spine; and
wherein the first lower inner bearing and the first lower outer bearing are coupled to and under the first bearing spine.

5. The load handler of claim 1,
wherein the one or more guide channels further includes a second guide channel;
wherein the one or more segmented channel bearings includes a second segmented channel bearing having a second outer channel bearing, and a second inner channel bearing;
wherein the second segmented channel bearing is inserted into the second guide channel with the second outer channel bearing closer to a second guide channel first lateral end than the second inner channel bearing; and
wherein the first load handler appendage is further coupled to a second arm slidingly inserted in the second channel guide.

6. A load handler for a lift truck comprising:
a frame with a guide channel;
a master fork coupled to an arm, wherein the arm is slidingly inserted in the guide channel;
a segmented channel bearing having an outer channel bearing, and an inner channel bearing;
wherein the segmented channel bearing is inserted into the guide channel with the outer channel bearing closer to the master fork than the inner channel bearing;
a slave fork with a slave carrier, the slave carrier slidingly coupled with the arm;
wherein the slave carrier has a slave bearing; and
wherein the slave bearing is interchangeable with at least one of the upper outer bearing and the lower outer bearing.

* * * * *